US008244623B2

(12) United States Patent
Colaio

(10) Patent No.: US 8,244,623 B2
(45) Date of Patent: Aug. 14, 2012

(54) METHOD AND SYSTEM FOR TRAINING TRADERS

(75) Inventor: Mark Colaio, New York, NY (US); June Colaio, legal representative, New York, NY (US)

(73) Assignee: Cantor Fitzgerald, LP, New York, NY (US)

( * ) Notice: Subject to any disclaimer, the term of this patent is extended or adjusted under 35 U.S.C. 154(b) by 0 days.

(21) Appl. No.: 11/972,075

(22) Filed: Jan. 10, 2008
(Under 37 CFR 1.47)

(65) Prior Publication Data

US 2008/0109351 A1    May 8, 2008

Related U.S. Application Data

(63) Continuation of application No. 11/097,454, filed on Apr. 1, 2005, now Pat. No. 7,341,455, which is a continuation of application No. 10/015,739, filed on Dec. 12, 2001, now Pat. No. 6,939,137.

(51) Int. Cl.
*G06Q 40/00* (2006.01)
(52) U.S. Cl. ............. 705/37; 705/25; 705/27.1; 705/35
(58) Field of Classification Search .................. 705/37, 705/25, 35
See application file for complete search history.

(56) References Cited

U.S. PATENT DOCUMENTS

| | | | |
|---|---|---|---|
| 3,581,077 A | 5/1971 | Damewood et al. | |
| 4,412,287 A | 10/1983 | Braddock, III | |
| 4,588,192 A | 5/1986 | Laborde | |
| 4,640,513 A * | 2/1987 | Montijo | 273/249 |
| 4,674,044 A | 6/1987 | Kalmus et al. | |
| 4,840,382 A | 6/1989 | Rubin | |
| 5,077,665 A * | 12/1991 | Silverman et al. | 705/37 |
| 5,083,800 A | 1/1992 | Lockton | |
| 5,102,143 A | 4/1992 | Winkelman | |
| 5,136,501 A | 8/1992 | Silverman et al. | |
| 5,150,907 A * | 9/1992 | Desmarais et al. | 273/240 |
| 5,270,922 A | 12/1993 | Higgins | |

(Continued)

FOREIGN PATENT DOCUMENTS

EP    0399850    11/1990

(Continued)

OTHER PUBLICATIONS

Using Reuters 3000 Xtra system for financial information education; Lewis G. Liu, Richard Holowczak; Online Information Review. Bradford: 2000. vol. 24, Iss. 5; pp. 1-6.*

(Continued)

*Primary Examiner* — Gregory Johnson

(57) ABSTRACT

Systems and methods are provided which enable students to participate in a simulated, electronic trading environment. The concept is one where the eSpeed rules based system and GUI may be used to educate students on the trading of financial products. The system may be "live" using real-time information and held either in a private virtual community (i.e. intra-school) or a wider community (i.e. inter-school). Fixed rules may be pre-programmed into the system or modified/customized by the participants. Participants may access the simulation via, for example, the Internet. The products traded in the simulation may include any simulated fixed income financial product. However, the simulation may not involve trading real financial products where there would be real financial risks. Simulated trading may be compared to real-world trading to create new financial products that may be tested and traded in the system.

26 Claims, 6 Drawing Sheets

U.S. PATENT DOCUMENTS

| | | | | |
|---|---|---|---|---|
| 5,297,032 | A | 3/1994 | Trojan et al. | |
| 5,305,200 | A | 4/1994 | Hartheimer et al. | |
| 5,388,836 | A * | 2/1995 | Foti | 273/256 |
| 5,513,848 | A * | 5/1996 | Keener | 273/244 |
| 5,655,088 | A | 8/1997 | Midorikawa et al. | |
| 5,689,651 | A | 11/1997 | Lozman | |
| 5,713,793 | A * | 2/1998 | Holte | 463/25 |
| 5,724,524 | A * | 3/1998 | Hunt et al. | 705/37 |
| 5,727,165 | A | 3/1998 | Ordish et al. | |
| 5,774,880 | A | 6/1998 | Ginsberg | |
| 5,779,549 | A | 7/1998 | Walker et al. | |
| 5,809,483 | A | 9/1998 | Broka et al. | |
| 5,857,176 | A | 1/1999 | Ginsberg | |
| 5,915,209 | A | 6/1999 | Lawrence | |
| 5,934,674 | A | 8/1999 | Bukowsky | |
| 5,950,176 | A * | 9/1999 | Keiser et al. | 705/36 R |
| 6,029,146 | A | 2/2000 | Hawkins et al. | |
| 6,322,076 | B1 | 11/2001 | Fikki | |
| 6,408,263 | B1 | 6/2002 | Summers | |
| 6,421,653 | B1 | 7/2002 | May | |
| H2064 | H | 5/2003 | Buchalter | |
| 6,634,950 | B2 | 10/2003 | Yoshimi et al. | |
| 6,709,330 | B1 * | 3/2004 | Klein et al. | 463/9 |
| 6,939,137 | B1 | 9/2005 | Colaio et al. | |
| 7,127,422 | B1 | 10/2006 | Bundy | |
| 7,130,824 | B1 | 10/2006 | Amanat et al. | |
| 7,177,833 | B1 | 2/2007 | Marynowski | |
| 7,242,669 | B2 | 7/2007 | Bundy et al. | |
| 7,330,834 | B1 | 2/2008 | LaPierre | |
| 7,341,455 | B2 | 3/2008 | Colaio et al. | |
| 7,359,876 | B1 * | 4/2008 | Redpath et al. | 705/37 |
| 7,428,506 | B2 | 9/2008 | Waelbroeck et al. | |
| 7,447,654 | B2 * | 11/2008 | Ben-Levy et al. | 705/37 |
| 7,454,382 | B1 | 11/2008 | Triplett | |
| 2001/0027430 | A1 * | 10/2001 | Sabourian | 705/35 |
| 2001/0034683 | A1 * | 10/2001 | Ren | 705/35 |
| 2001/0039530 | A1 * | 11/2001 | Annunziata | 705/37 |
| 2001/0042037 | A1 * | 11/2001 | Kam et al. | 705/36 |
| 2001/0049651 | A1 * | 12/2001 | Selleck | 705/37 |
| 2001/0056398 | A1 | 12/2001 | Scheirer | |
| 2002/0002531 | A1 | 1/2002 | Lustig et al. | |
| 2002/0023048 | A1 | 2/2002 | Buhannic et al. | |
| 2002/0026404 | A1 * | 2/2002 | Thompson | 705/37 |
| 2002/0059135 | A1 * | 5/2002 | Ma et al. | 705/37 |
| 2002/0072978 | A1 * | 6/2002 | Odom et al. | 705/26 |
| 2002/0083213 | A1 | 6/2002 | Rhodes et al. | |
| 2002/0091617 | A1 | 7/2002 | Keith | |
| 2002/0128952 | A1 * | 9/2002 | Melkomian et al. | 705/37 |
| 2002/0138401 | A1 | 9/2002 | Allen et al. | |
| 2002/0156716 | A1 | 10/2002 | Adatia et al. | |
| 2002/0174055 | A1 * | 11/2002 | Dick et al. | 705/37 |
| 2002/0184134 | A1 * | 12/2002 | Olsen et al. | 705/37 |
| 2002/0198816 | A1 | 12/2002 | Gilbert et al. | |
| 2003/0014351 | A1 * | 1/2003 | Neff et al. | 705/37 |
| 2003/0018456 | A1 * | 1/2003 | Browne et al. | 703/2 |
| 2003/0093362 | A1 | 5/2003 | Tupper et al. | |
| 2003/0126068 | A1 | 7/2003 | Hauk et al. | |
| 2004/0064395 | A1 | 4/2004 | Mintz et al. | |
| 2005/0075963 | A1 | 4/2005 | Balabon | |
| 2005/0137961 | A1 | 6/2005 | Brann et al. | |
| 2005/0228741 | A1 | 10/2005 | Leibowitz | |
| 2005/0246263 | A1 | 11/2005 | Ogg et al. | |
| 2006/0106707 | A1 | 5/2006 | Shetty et al. | |
| 2006/0173764 | A1 | 8/2006 | Costakis et al. | |
| 2006/0259399 | A1 | 11/2006 | Mintz et al. | |
| 2006/0265319 | A1 | 11/2006 | Friesen et al. | |
| 2007/0027796 | A1 | 2/2007 | Claus et al. | |
| 2007/0027797 | A1 | 2/2007 | Claus et al. | |
| 2007/0043650 | A1 | 2/2007 | Hughes et al. | |
| 2007/0043653 | A1 | 2/2007 | Hughes et al. | |
| 2007/0083452 | A1 | 4/2007 | Mayle et al. | |
| 2008/0172318 | A1 | 7/2008 | Bartko et al. | |
| 2008/0172319 | A1 | 7/2008 | Bartko et al. | |
| 2008/0313095 | A1 | 12/2008 | Shalen | |
| 2009/0132335 | A1 | 5/2009 | Pein et al. | |

FOREIGN PATENT DOCUMENTS

| | | | |
|---|---|---|---|
| JP | 2001187267 A | * | 7/2001 |

OTHER PUBLICATIONS

AU Examiners Report dated Jul. 16, 2010 for AU Application No. 2008232500; 2 pages.

Mearian, Lucas, trades at Top Speed, Mar. 3, 2003, Computerworld, v37n9, pp. 21-24.

Neovest Launches Intelligent, Automated order Entry, Jun. 11, 2001, Business Wire, p. 2080.

Build Online Trading Skills with Lind Simulated Trading, Jun. 15, 2003, Futures, v32n8, p. 36.

Notice of Allowance for U.S. Appl. No. 12/686,362; 34 pages; Oct. 5, 2010.

Notice of Allowance for U.S. Appl. No. 12/686,358; 33 pages; Oct. 5, 2010.

PCT Search report and Written Opinion for International Application No. PCT/US08/58983; 15 pages; Sep. 10, 2008.

*PCT Invitation to pay Additional Fees, and where Applicable, Protest Fees* for International Application #PCT/US08/58983, 2 pages, Jun. 18, 2008.

U.S. Appl. No. 11/695,242 entitled *Systems and Methods for Processing and Transmitting Test Orders* by James Driscoll, et. al., filed Apr. 2, 2007.

U.S. Appl. No. 11/695,277 entitled *Methods and Systems for Placing, Transmitting and Ranking Trading Orders* by James Driscoll, et. al., filed Apr. 2, 2007.

U.S. Appl. No. 11/695,257 entitled *Products and Processes for Differentiating Trading Orders* by James Driscoll, et. al., filed Apr. 2, 2007.

U.S. PTO Office Action for U.S. Appl. No. 11/695,230; 10 pages; Dec. 30, 2008.

U.S. Appl. No. 11/695,230 entitled Test Trading by James Driscoll, et. al., filed Apr. 2, 2007.

U.S. PTO Office Action for U.S. Appl. No. 11/695,242; 6 pages; Oct. 7, 2008.

U.S. PTO Office Action for U.S. Appl. No. 11/695,277; 6 pages; Nov. 21, 2008.

U.S. PTO Office Action for U.S. Appl. No. 11/695,257; 6 pages; Nov. 21, 2008.

U.S. PTO Office Action for U.S. Appl. No. 11/695,277; 9 pages; Apr. 6, 2009.

U.S. PTO Office Action for U.S. Appl. No. 11/695,257; 11 pages; Apr. 3, 2009.

U.S. PTO Office Action for U.S. Appl. No. 11/695,242; 14 pages; Jul. 7, 2009.

Pending U.S. Appl. No. 12/564,377, filed Sep. 22, 2009.

Notice of Allowance for U.S. Appl. No. 11/695,230, Oct. 30, 2009; 4 pages.

Supplemental Notice of Allowance for U.S. Appl. No. 11/695,230, Nov. 16, 2009; 4 pages.

Notice of Allowance for U.S. Appl. No. 11/695,257, Dec. 8, 2009; 48 pages.

Notice of Allowance for U.S. Appl. No. 11/695,242; Dec. 15, 2009; 9 pages.

Notice of Allowance for U.S. Appl. No. 11/695,277; Jan. 12, 2010; 97 pages.

Mathew Schwartz, Test Case, Aug. 2000, Computerworld, p. 62.

Notice of Allowance for U.S. Appl. No. 12/564,377; Apr. 5, 2010; 12 pages.

"Aegis Software Develops Allocations Specification for Futures and Foreign Exchanges," Oct. 23, 2006, Business Wire, p NA.

U.S. Appl. No. 12/780,361, filed May 14, 2010; 43 pages.

U.S. Appl. No. 12/564,377, filed Sep. 22, 2009; 43 pages.

U.S. Appl. No. 12/686,365, filed Jan. 12, 2010; 43 pages.

U.S. Appl. No. 12/686,358, filed Jan. 12, 2010; 46 pages.

U.S. Appl. No. 12/686,362, filed Jan. 12, 2010; 46 pages.

U.S. Appl. No. 12/686,368, filed Jan. 12, 2010; 43 pages.

"Thunderhead: Thunderhead announces its XML adapter for DTCC Deriv/SERV trade matching: the kay to real time OTC derivatives trade matching," Jun. 30, 2005, M2 Presswire.

Notice of Allowance for U.S. Appl. No. 10/015,739; 3 pages; May 17, 2005.
Notice of Allowance for U.S. Appl. No. 10/015,739; 7 pages; Jan. 14, 2005.
US PTO Office Action for U.S. Appl. No. 10/015,739; May 27, 2004; 10 pages.
Notice of Allowance for U.S. Appl. No. 11/097,454; 6 pages; Oct. 10, 2007.
US PTO Office Action for U.S. Appl. No. 11/097,454; May 7, 2007; 8 pages.
US PTO Office Action for U.S. Appl. No. 11/097454; May 16, 2006; 8 pages.
US PTO Office Action for U.S Appl. No. 11/097,454; Nov. 22, 2005, 9 pages.
US PTO Office Action for U.S. Appl. No. 11/097,454; Aug. 30, 2005, 7 pages.
Mosser, Mike and Codding, Jamey, "Gentlemen, start your exchange," Jun. 2000, Futures v29n6, pp. 76-80.
"Aegis Software upgrades exchange simulator for NASDAQ and London Stock Exchange," May 30, 2006, Business Wire.
Isaac, M. et al., Price Controls and the Behavior of Auction markets: An Experimental Examination; American Economic Review, vol. 71, pp. 448-459 (Jun. 1981).
Forsythe, R et al., "Asset Valuation in an Experimental Market," Econometrica, vol. 50, pp. 537-567 (May 1982).
Plott, C. et. al. "Efficiency of Experimental Security Markets with Insider Information: An Application of Rational Expectations Models," Journal of Political Economy, vol. 90, pp. 663-698 (Aug. 1982).
Plott, C. et al., "Externalities and Corrective Policies in Experimental Markets," Economic Journal, vol. 93, pp. 106-127 (Mar. 1983).
Plott, C. et al. "Rational Choice in Experimental markets." Journal of Business, vol. 59, pp. S301-S327 (Oct. 1986).
Landis, K., "Multi-Talented System Opens Windows for Traders World," Wall Street Computer Review, pp. 86-93 (Apr. 1988).
Matthew, J., " OTC Success Spurs Specialized Trading Systems," Wall Street Computer Review, pp. 28-38 (Sep. 1989).
Leinweber, D., "Knowledge-Based Systems for Financial Applications," IEEE Expert, vol. 3, pp. 18-20 (Fall 1998).
Noth, M. et al. "Information Aggregation in Experimental Asset markets: Traps and Misaligned Beliefs," Social Science Working Paper No. 1060. Pasadena: California Institute of technology (Apr. 1999).
Bossaerts, P. et al., "Basic Principles of Asset Pricing Theory: Evidence from Large-Scale Experimental Financial Markets," Social Science Working Paper No. 1070. Pasadena: California Institute of Technology (Feb. 2000).
Charles Darrow, Monopoly, Parker Brothers Real Estate Trading Game, 1934.
Investopedia: Tutorials and Lessons, at http://www/investopedia.com/university (printed Feb. 21, 2006).
U.S. Appl. No. 12/780,403; filed May 14, 2010; 43 pages.
Notice of Allowance for U.S. Appl. No. 12/686,365; 45 pages; Jul. 7, 2010.
U.S. PTO Office Action for U.S. Appl. No. 12/780,361; Jun. 27, 2011; 16 pages.
U.S. PTO Office Action for U.S. No. 12/780,403; Jun. 28, 2011; 17 pages.
U.S. PTO Office Action for U.S. Appl. No. 12/858,912; Sep. 26, 2011; 6 pages.
EP Search Report for Application No. 08733038.7; 8 pages; Dec. 30, 2011.
U.S. PTO Office Action for U.S. Appl. No. 13/153,625; Dec. 27, 2011; 7 pages.

* cited by examiner

METHOD AND SYSTEM FOR TRAINING TRADERS

This application is a continuation of U.S. patent application Ser. No. 11/097,454 filed Apr. 1, 2005 now U.S. Pat. No. 7,341,455; which is a continuation of U.S. patent application Ser. No. 10/015,739 filed Dec. 12, 2001, now U.S. Pat. No. 6,939,137, issued Sep. 6, 2005, each of which is hereby incorporated by reference herein in its entirety.

BACKGROUND OF THE INVENTION

The present invention relates to a method and system for training traders. More particularly, the present invention relates to a method and system that provides students the opportunity to gain valuable skills and experience in trading financial products.

The advent of high-speed networking technologies and the widespread adoption of trading platforms via personal computers, the Internet, wireless and handheld devices, etc., have brought about rapid change and development of the trading function in professional financial services institutions. Such changes include automation of back office operations (i.e. order processing, trade-clearing, etc.) and the creation of new financial instruments made possible with the increased capacity of robust mainframe and supercomputing information systems that model enormous amounts of data.

This widespread utilization of technology has caused traders to place a greater emphasis on strategic decision making, implementing such strategic changes substantially instantaneously from the terminal of a trading desk. Technology has become a fundamental component of the trading profession, and the ability of traders to leverage technology in obtaining, analyzing, synthesizing and reacting to a vast amount of information from a variety of sources is an important cornerstone of a trader's success.

Accordingly, the trading function at any financial institution requires a refined balance of technical know-how and real-world experience that can only be gained through active participation in a market-based financial exchange. While a formalized education might convey the requisite financial and technical skills needed to perform on the job, this method of education does not lend itself toward the latter task of gaining an intimate knowledge of market behavior and a polished acumen for financial transactions. This expertise is essential to the success of any trader and can only be gained through direct experience.

Known systems and methods for training financial traders traditionally include one in which knowledge is passed down directly from one generation of traders to the next through apprenticeships and in-house training programs at brokerage houses, brokers, dealers, broker-dealers and other financial services institutions. Through this method of apprenticeship and direct observation, aspiring traders are able to integrate the experience and expertise of veteran brokers into their own professional practices. This requirement is inconvenient and inefficient, however, in that it requires the presence of a licensed professional trader and, in most cases, individualized attention—resources unavailable in a traditional university learning environment.

SUMMARY OF THE INVENTION

It is therefore an object of the present invention to provide a system and method for training students in the art of trading financial products via an electronically simulated trading environment that enables students to trade simulated financial products—i.e., financial products that have no intrinsic value and, therefore, that have no real-world financial risk—within the simulated market.

It is also an object of the present invention to provide a system and method of training traders through which students actively exchange simulated financial products in a simulated market that responds to, and requires action from, participating students.

It is also an object of the present invention to provide a system and method through which students, using a graphical user interface (GUI), would be able to trade products with no intrinsic value but whose value was determined by participation in the simulated market.

It is also an object of the present invention to provide a system and method that teaches important trading skills to students such as how to obtain, analyze and synthesize critical financial information, react to abrupt changes in market conditions, read and react to market behavior and dynamics, and the perspective with which one must become familiar when participating in a dynamic marketplace.

It is further an object of the present invention to present a GUI that enables participants to receive real-time pricing information (i.e., bid and ask quotes), news stories, SEC filings, etc. The GUI may also provide participants an opportunity to trade directly with other participants in real-time within the same system.

These and other objects of the present invention are achieved by preferably providing rules-based systems and methods to create a simulated financial exchange that may teach students how to trade financial products. The system may contain fixed pre-programmed rules that emulate real markets. Participants may also create their own rules or adjust existing ones to customize the simulated exchange to meet their particular needs. The system may operate on any combination of Local Area Network (LAN), Wide Area Network (WAN), Virtual Private Network (VPN), wireless network, or any available means of communicating information among more than one computing device. The system may relate real-time information between the system and the simulation's participants. Participants may access the system with personal computing devices (PCs), Personal Digital Assistants (PDAs), or any networked computing device via the Internet, a self contained server network, or any means of connecting participating computing devices.

The simulation preferably requires at least one participant and each participant should preferably be registered to participate in the simulation. Each participant may receive an account upon their registration. Participants should not trade real financial products that maintain real financial risk. Rather, the products traded may be simulated financial products that assume the benefits of similar products traded in real markets. Or, the products traded may be real products, but the trades may be fictional and not actually executed.

The implemented method may consist of some method of payment, either a flat participation rate or a fee-per-trade pricing mechanism. All registration fees may be furnished by the participating educational institution(s), corporate sponsor(s), or other source. The registration fees may be pooled to form a winner's jackpot. At the conclusion of the simulation the participant(s) with the highest account value may be awarded an amount from the jackpot to be pre-specified by the participants, or administrators, of the closed trading simulation. This amount could be a fixed sum, some percentage of the total per trade fee generated by the participant(s), or any method of measuring and rewarding superior performance.

The system may allow for trading any combination of financial products. Initial pricing of the financial products may be based on the actual fair-market value of the financial products or based on the difference between real market prices and simulated market prices. In the alternative, new products may be created, tested, traded and studied within the closed simulated exchange. Orders may be placed and transactions may be filled based on the similar bid-ask system that governs real financial exchanges; that is buyers 'bid' prices and sellers 'ask' prices for specified financial products on the simulated exchange. A real trading screen or any screen could be provided in real time on the terminal in a window so the students could see how it is working in the real world. One could utilize informational pages, spreadsheets and other information tools and resources in the specified system and method.

Participants may include individuals competing against other individuals, groups of individual participants competing against other groups, a computerized specialist function interacting with at least one other participant, or any combination of groups and individuals competing against each other. An account may be assigned to each individual or group participant. The participants may compete among each other in a private, local community (such as participants within a classroom, academic department or college/school at a single university), or within a larger community (such as between groups at more than one university).

By simulating an interactive and real-time market for products, the present invention provides potential traders with a simulated trading environment similar to the environment of professional traders in real financial exchanges. This simulation improves the professional awareness of potential traders and heightens their understanding of the manner in which financial products and markets behave.

By providing them with such unequivocal experience, students who participate in the simulated training will be better prepared and more intellectually equipped to perform in live markets. In doing so, the system to eliminate a significant portion of the training and learning cost associated with trader development. It is the elimination of such costs, traditionally incurred by the new trader's employer, that represents value in implementing the present invention.

BRIEF DESCRIPTION OF THE DRAWINGS

Further features of the invention, its nature and various advantages will become more apparent from the following detailed description of the invention, taken in conjunction with the accompanying drawings, in which like reference characters refer to like parts throughout, and in which.

DETAILED DESCRIPTION OF THE INVENTION

The present invention is now described in connection with FIGS. 1-6.

Figure 1:
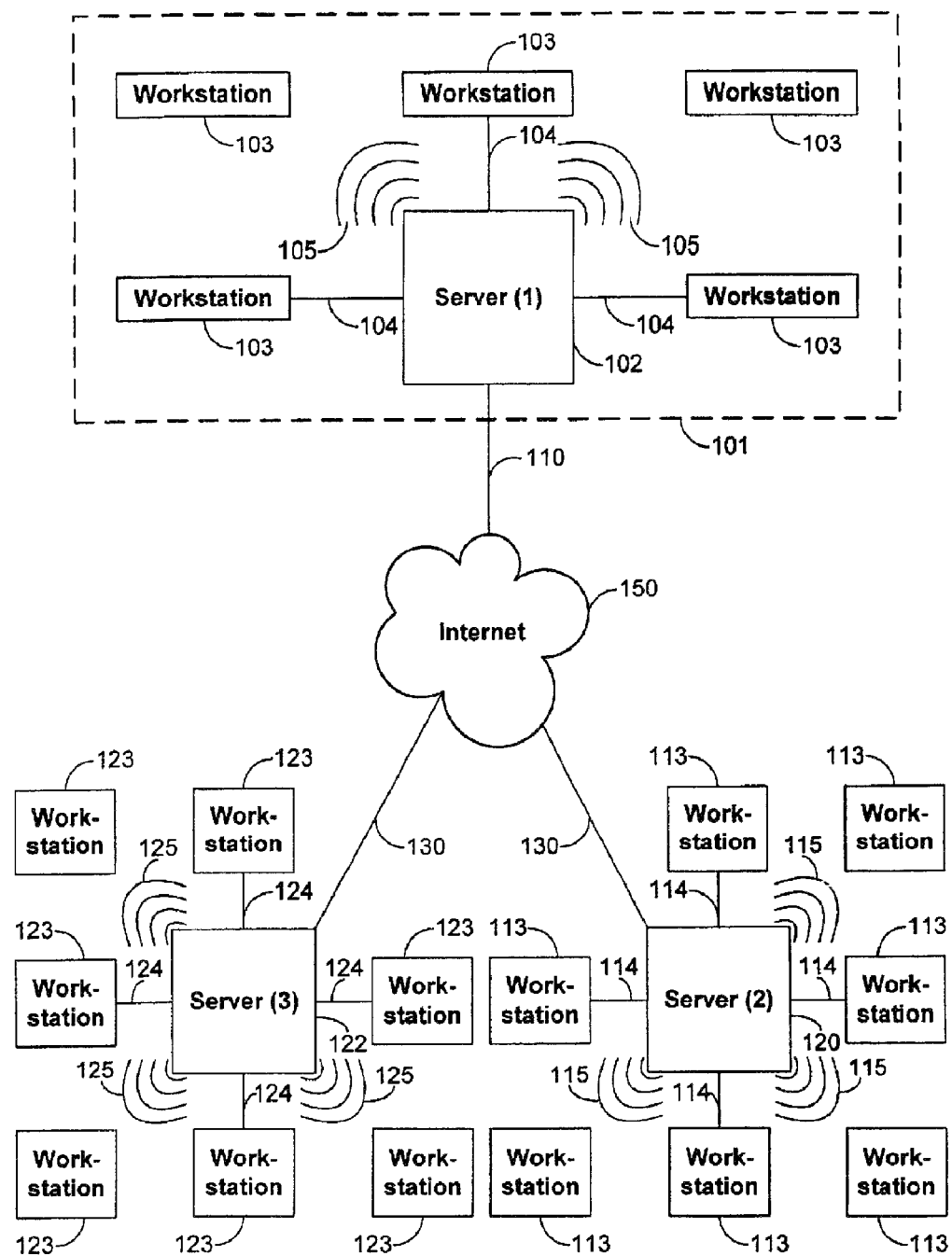
FIG. 1 is a diagram of the information system architecture and configuration of hardware that may be used to implement the present invention.

Turning first to FIG. 1, an example of a systems architecture 100 that may be used to implement one embodiment of the present invention is shown. As illustrated, hardware 100 may include one or more local workstations 103 at a general location connected to one or more servers 102 (i.e. for intraschool competitions) and one or more workstations 113 and 123 at other participating schools connected to one or more local servers 112 and 122 (i.e. for interschool competitions) or any such means available that enables access to the simulated trading environment. Workstations 103, 113 and 123 may include any device suitable for presenting data and, in preferred embodiments of this invention, accepting input. For example, workstations 103, 113 and 123 may be any combination of personal computers, laptop computers, mainframe computers, dumb terminals, data displays, Internet browsers, Personal Digital Assistants (PDAs), two-way pagers, wireless terminals, portable telephones, or any other form of networked personal computing device.

The trading simulator application software is installed on server(s) 102 to create a central repository of information within which the simulation may take place. Multiple wired and wireless connections 104 and 105 may be made between server 102 and workstations 103 and between server 102 and other servers 112 and 122 via the Internet 150 to orchestrate the trading simulation among students using workstations 103, 113 and 123. Workstations 103, 113 and 123 submit and receive commands from server 102. In the case of workstations 113 and 123, gateway servers 112 and 122, or any applicable device, may be used to access and communicate with server 102 via the Internet 150. In alternative embodiments, however, workstations 103, 113 and 123 may communicate with additional hardware and software, enable direct access via the Internet 150 using a centralized Application Service Provider (ASP) or similar service, or may include hardware to orchestrate trading in a distributed fashion without requiring server 102. Server 102, and any additional servers, may consist of any suitable circuitry, devices or programs capable of processing data such as microprocessors, personal computers, network servers, mainframe computers, dedicated computer systems, etc.

As shown, server 102 may be connected to workstations 103, 113, or 123 either directly or via gateway servers 112 and 122, the Internet 150, or each of network devices 104, 105, 110 and 130, and may consist of any suitable data network for communicating data between workstations 103, 113 and 123, such as any combination of a local area network, a wide area network, the Internet, an intranet, a wireless network, a hard wired connection, a dial-up network, a virtual private network, or any available method of connecting multiple workstations.

When used to implement a bid/offer trading simulation for training traders within a single or across multiple networks as described above, hardware 100 may enable a participant to submit a bid to buy or offer to sell an item at one of workstations 103, 113 and 123. This bid or offer may then be communicated to server 102, where the bid or offer can be ranked and stored in a bid-offer queue. The ranking may be based upon time of submission, price, or any other suitable criterion. The bid or offer may then be presented to other traders via other workstations 103, 113 and 123 dependent upon its ranking in the bid-offer queue. Once displayed, the bid or offer can then be hit or taken, respectively, by one or more of the other traders so that a trade of the item can proceed to execution.

Figure 2:
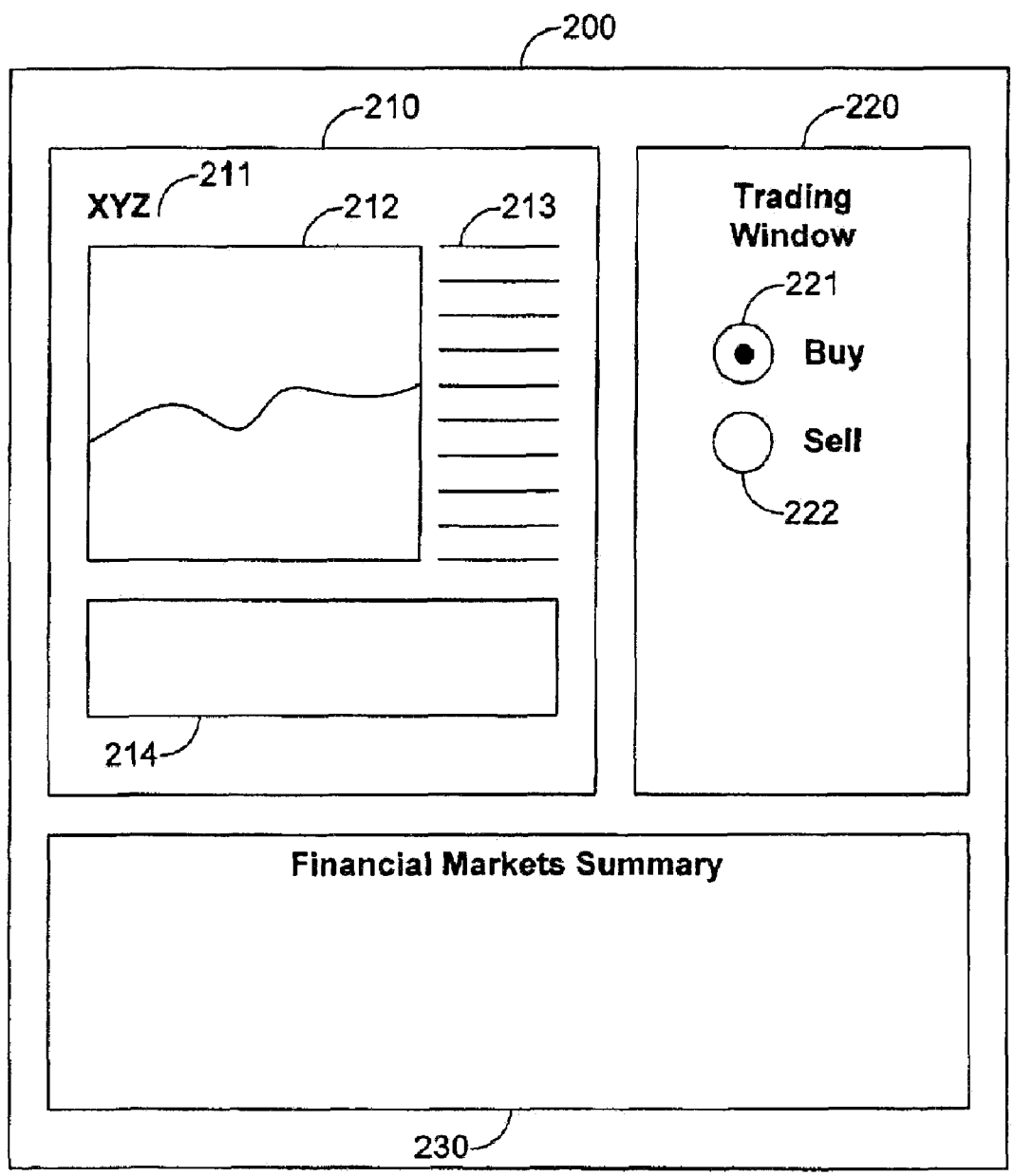
FIG. 2 is an illustration of a full-screen GUI display that may be presented in accordance with one embodiment of the present invention.

FIG. 2 shows an example of a Graphical User Interface (GUI) 200 for presenting the functionality and information pertaining to the present invention and to be used by participants via workstations 103, 113 and 123. As illustrated, simulated and actual financial information is presented via a financial information window 210 which may include charts, graphs, tables, spreadsheets or any medium of presenting detailed financial information about any particular financial product traded in the simulation. The financial information window 210 may include ticker symbol 211 or other means to properly identify the specified financial product, graph 212 relating price history, volatility, or any pertinent information regarding the financial product, table 213 containing current price, bid and ask quotes, daily volume and any other real-time decision making information as specified by a user, and footer 214 which may contain the bid-offer queue for the specified issue as well as the ability to access more detailed information about the company and/or financial product.

GUI 200 also includes an interactive trading window 220 (discussed in greater detail in FIG. 3) containing methods to 'Buy' 221 and 'Sell' 222 financial products. Each method consists of input fields that the user may complete as well as an execute function that the user may trigger to complete a transaction.

Also included in GUI 200 is a financial markets window 230 consisting of a table of real time news stories concerning financial markets which may include new stories, SEC filings, index quotes or any pertinent information as specified by the user. In accordance with the present invention, these portions of GUI 200 enable students to acquire trading finesse and sound trading judgment through the ability to assimilate and analyze real time financial information quickly for the purpose of making sound, assertive and responsible financial decisions based on dynamic, constantly-changing market conditions.

Figure 3:
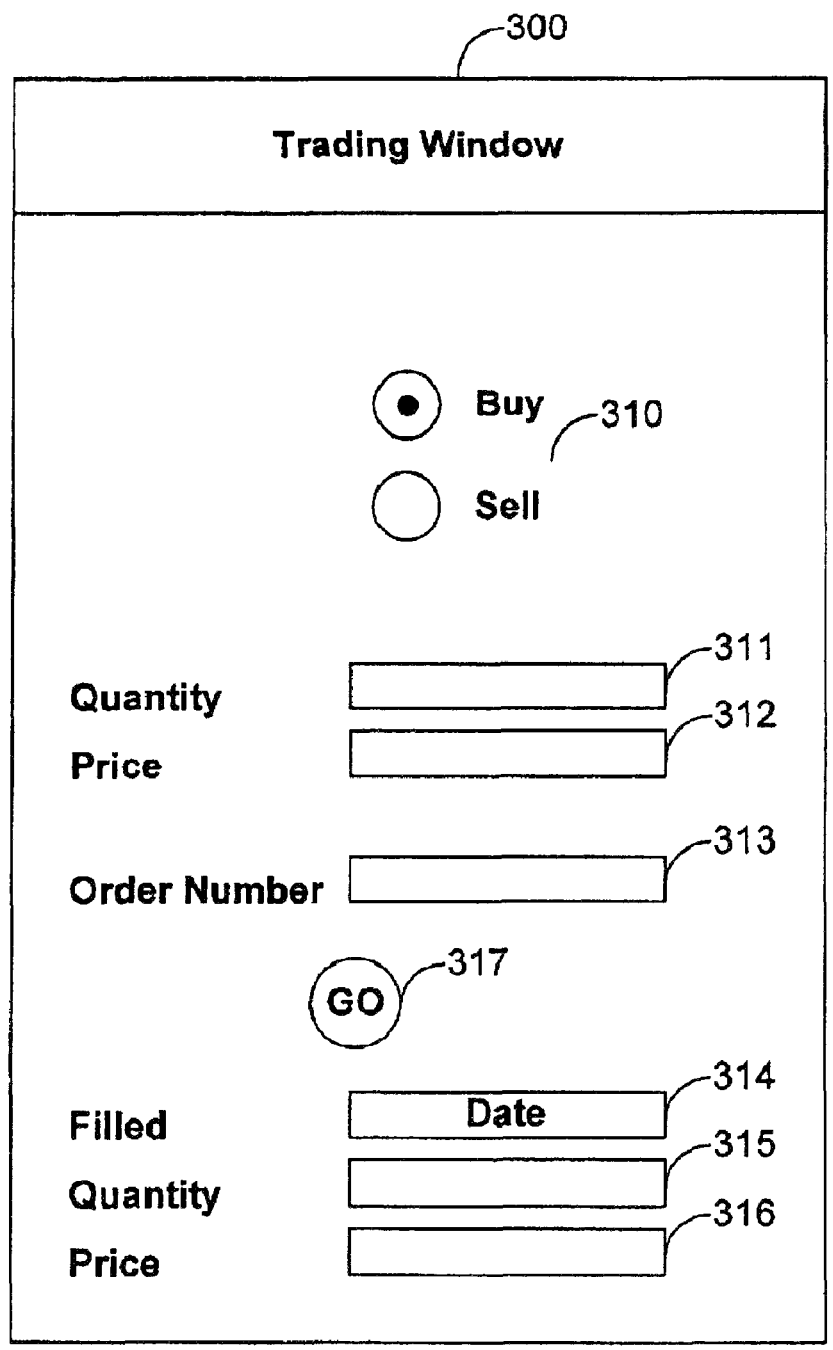
FIG. 3 is a closer illustration of the trading window display shown in FIG. 2 that may be presented in accordance with one embodiment of the present invention.

Turning to FIG. 3, an interface 300 is shown as one embodiment of the system used to submit buy and sell orders within the trading simulation in accordance with the present invention. To buy or sell a financial product in the training simulation the user may select the type of transaction they wish to complete 310, enter information in the number of shares to purchase field 311, enter a per share dollar value for the bid or offer limit in field 312, and execute the transaction, in the present embodiment by employing a device similar to 'Go' button 317. An order number 313 may then be issued by the system to track the order. When the order is filled, a time stamp, actual shares traded and price per share may fill fields 314, 315 and 316, respectively, and become part of the record associated with that order number. Interface 300 may be presented on a trader's workstation and information may be retrieved and/or inserted using any variety of input/output device.

Figure 4:
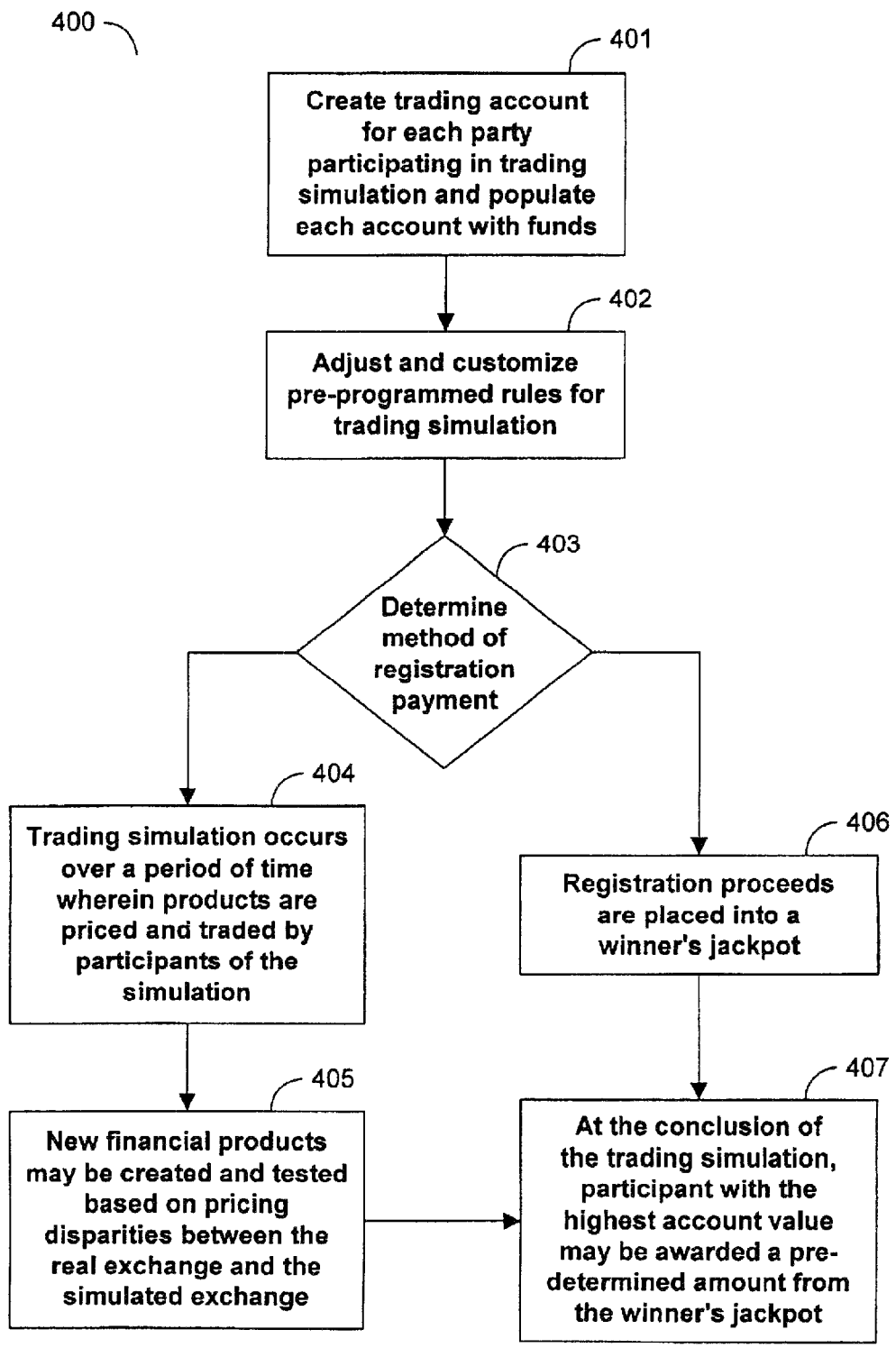
FIG. 4 is a flow diagram illustrating the process for implementing one embodiment of the method and system specified by the present invention.

Turning to FIG. 4, a process 400 for implementing the simulated trading environment in accordance with one embodiment of the present invention is shown. As illustrated at step 401, process 400 first allows the administrators of the trading simulation to create accounts for each group or individual participant. The accounts are then populated with an appropriate amount of funds to properly gauge the growth of the account over the specified time period. Funds may include cash, product, or any medium of exchange determined in step 402.

The next step 402 specifies that the participants adjust and/or customize the body of rules that govern financial transactions in the simulated trading environment. While each simulation may employ its own variation of the pre-programmed rules (as determined by all or selected participants), this customization may be performed centrally with any input/output device so that the same rules apply to all participants in the simulation.

Process 400 next specifies that each participant pay a fee for use of the trading simulation in step 403. This fee may be a fixed flat rate for participation, a fee-per-trade for each trade placed within the simulated exchange, or any method as specified by the participants in step 402. The fee may be paid for by a pre-determined body such as a university, corporate sponsor, or any benefactor.

In step 406, the registration fees may be pooled together and placed in a winners jackpot to be properly distributed at the conclusion of the trading simulation in step 407.

Process 400 then specifies for the trading simulation to take place in step 404. During a time period specified in step 402 participants may research, buy and sell products in a simulated trading environment. Products may include fixed income financial products such as treasuries, agencies, mortgages, swaps, REPOs, corporates, etc. These instruments may initially be priced according to their real market value, according to a price pre-determined by the simulation's participants in step 402, or otherwise determined by participants of the simulation.

Figure 6:
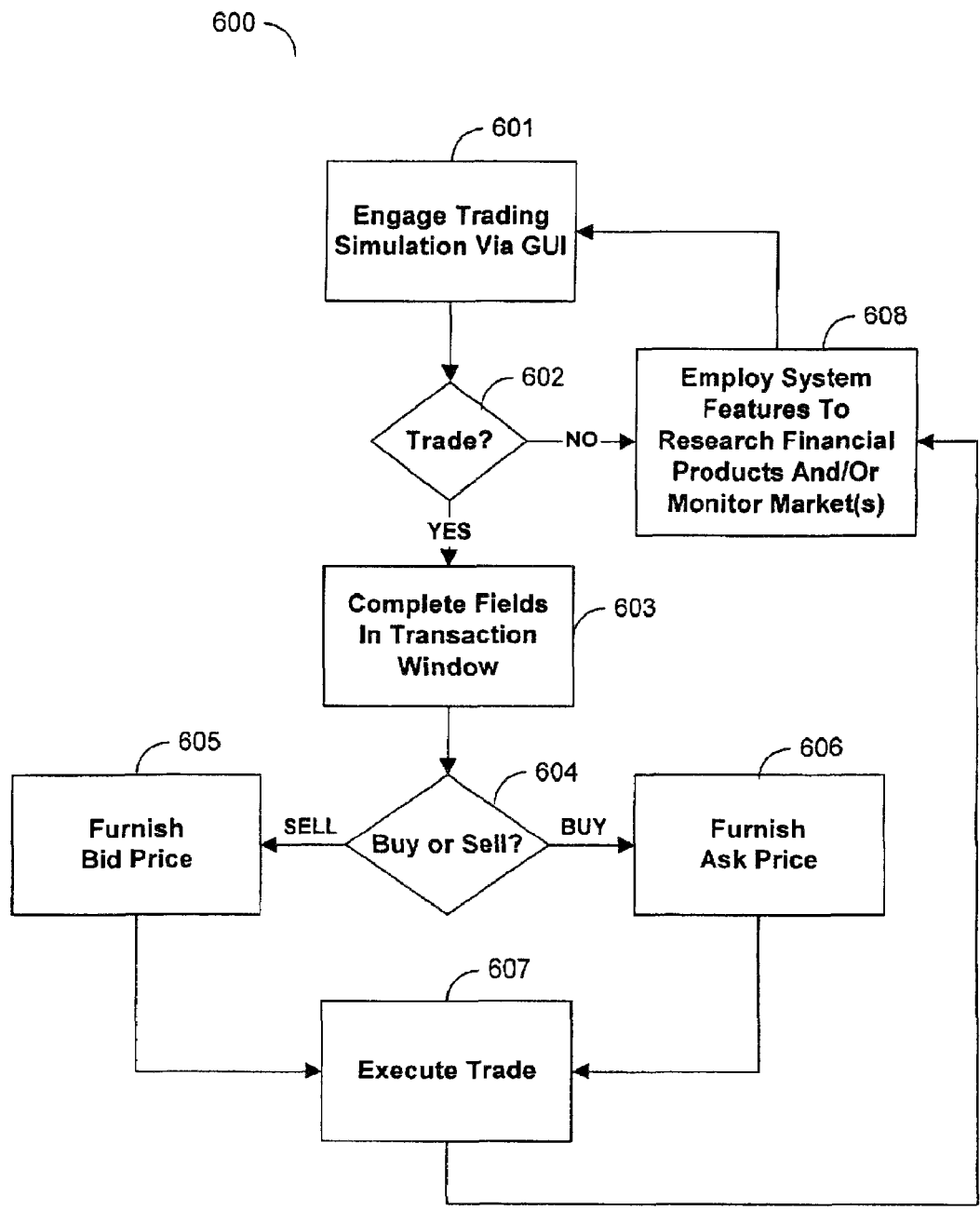
FIG. 6 is a Process Flow Diagram illustrating a method to engage and employ the GUI to make transactions and participate in the simulated financial exchange as specified by one embodiment of the system and method of the present invention.

Once trading commences within the simulated exchange, products may be priced at the simulated market value, with buyers and sellers in the simulation specifying ask and bid limits to price the products. A more detailed example for processing bids and offers that may be executed in server 102 (FIG. 1) in accordance with one embodiment of the present invention is depicted in process 600 (FIG. 6).

Turning back to FIG. 4, process 400 next specifies the creation and testing of new financial products 405 in the simulated market based on the spread differentials and arbitrage opportunities that may arise from disparities between the simulated market and an actual market. Such products may behave as derivatives of the simulated market, offering participants an opportunity to learn how such products are traded in an open market and how their behavior may be gauged in relation to the base-market.

The final step of process 400, step 407, requires the dispersal of a financial reward to the winner of the simulation in step 404. The winner may be the group or individual participant with the highest account value at the end of the simulation, or any other method of determining the winner as specified in step 402. The declared winner may be awarded any amount of the fees allocated to the winner's jackpot in step 406 as determined by the participants in step 402.

Figure 5:
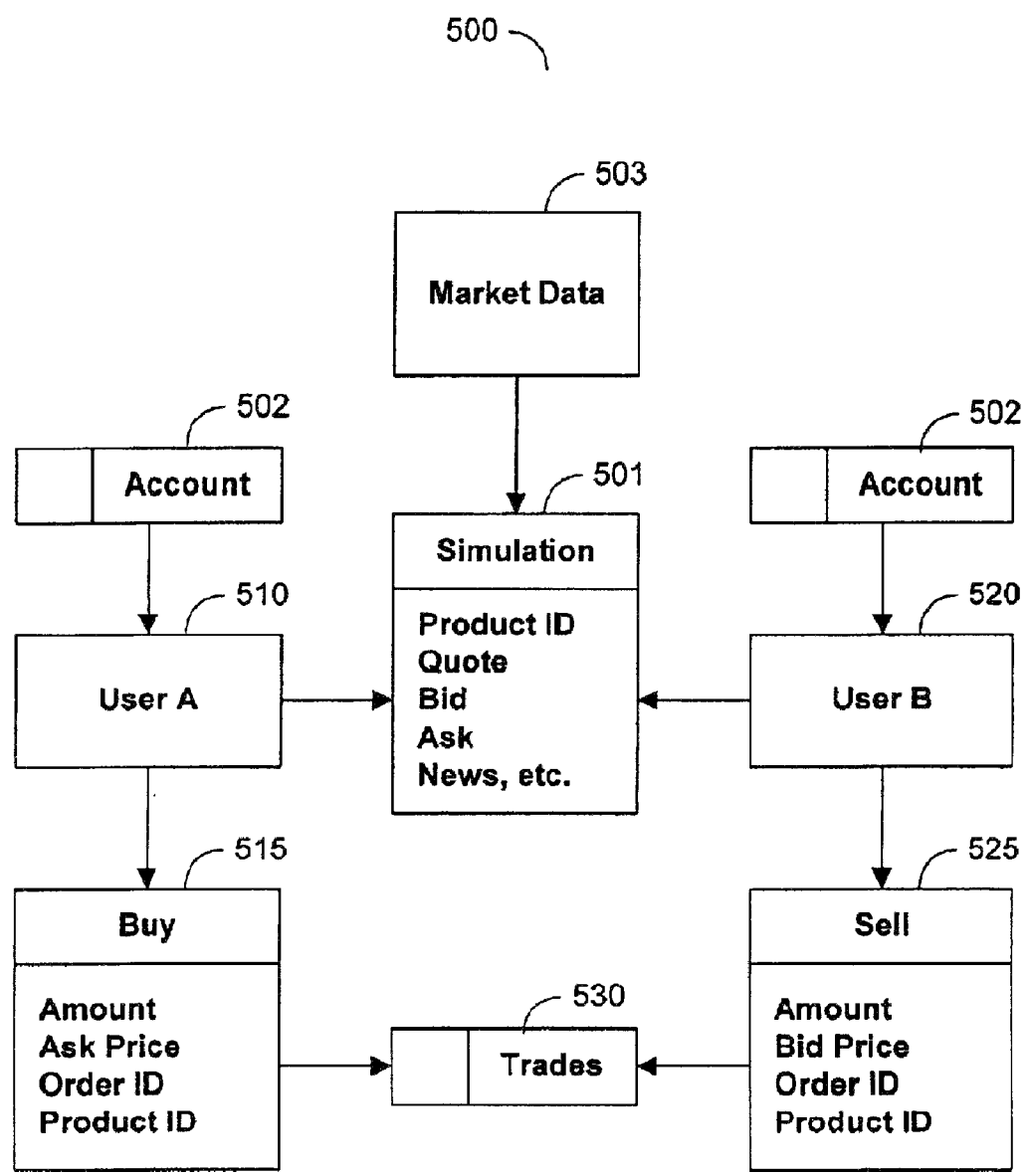
FIG. 5 is a Data Flow Diagram (DFD) of the information transacted during a simulated trade taking placing as specified by one embodiment of the system and method of the present invention.

Turning to FIG. 5, one embodiment of the flow of data and processes for implementing the present invention is shown in Data Flow Diagram (DFD) 500. DFD 500 specifies simulation 501 as the central process in the system, consisting of inputs from User Account Data 510 and 520, a Real Market Data Source 503 and simulated market data from Trades Data Store 530. User A 510 and User B 520, defined by records specified in Account Data Store 502, place orders via Buy 515 and Sell 525 processes depicted in DFD 500. The process for engaging the GUI for the purpose of placing such trades is further depicted in process 600 (see FIG. 6). Turning back to FIG. 5, upon completing steps 510 and/or 515 of process 500, orders are placed in Trades Data Store 530. The bid/ask information is then relayed to the simulation and can be viewed via the financial information window 210 depicted as part of GUI 200 (see FIG. 2).

Turning back to FIG. 5, once trades are accepted by matching the bid/ask with a respective ask/bid from counterparties participating in the simulation, the orders are marked as filled from Trade Data Store 530 and removed from the queue. The user's account information is also updated with the transaction information in Account Data Store 502. Real-time information regarding most recent trades constantly update the simulation to provide users with the look and feel of a dynamic and interactive trading environment.

Turning to FIG. 6, one embodiment of a process that may be implemented for employing the GUI to engage the simulation is shown in Process Flow Diagram (PFD) 600. PFD 600 specifies that the user engage the trading simulation in step 601. Decision Point 602 then determines whether or not a trade may take place. If a trade does not take place, the user may continue to engage the system for the purpose of researching financial products and/or monitoring markets 608. If the user desires to place a trade, the user may complete the necessary fields of the transaction window 603. The user will then be prompted to determine the type of transaction by way of the buy or sell decision point 604. If the users elects for a sell transaction, a bid price must be furnished in the trading window in step 605. If the user elects a buy transaction, an ask price must be furnished in the trading window in step 606. When all appropriate information required by the trading window is furnished by the user, the trade is then executed in step 607. Once the trade is executed, the user may once again return to employing the GUI to engage the system for research 608 and trading 601 purposes.

Those skilled in the art will appreciate that the present invention can be practiced by other than the described embodiments, which are presented for purposes of illustration and not of limitation, and the present invention is limited only by the claims.

What is claimed is:

1. A method comprising:
assigning by at least one computing device a simulated amount of a financial instrument to at least a first trader in a closed exchange, the closed exchange comprising the at least one computing device and operating over a period of time simulating a real-time market for the financial instrument;
assigning by the at least one computing device an amount of simulated funds to at least a second trader in the closed exchange;
receiving by the at least one computing device at least one order for the financial instrument from one of the first trader and the second trader, wherein the order comprises at least one of (i) a bid to purchase the financial instrument on a simulated market and (ii) an offer to sell the financial instrument on a simulated market, wherein the first and the second traders are in communication with each other over a computer network;
causing by the at least one computing device an interface screen to be displayed at one or more workstations associated with a trader, the interface screen comprising at least one item of real-time information associated with the financial instrument from the simulated market and at least one item of real-time information associated with the financial instrument from an actual market, the one or more workstations in electronic communication with the at least one computing device;
receiving by the at least one computing device at least one counter order for the financial instrument from the other one of the first trader and the second trader;
executing by the at least one computing device at least one trade between the first trader and the second trader for the financial instrument at a price specified by at least one of the traders and for an amount of simulated funds determined based on the price; and
creating by the at least one computing device a simulated financial product based at least in part on at least one difference between the simulated market and the actual market.

2. The method of claim 1, wherein the amount of simulated funds assigned to the second trader is based on the period of time for simulated trading in the closed exchange.

3. The method of claim 1,
in which the at least one order is received pursuant to the simulating of the real-time market for the financial instrument, and
in which each trader has an account with an account value, further comprising:
receiving from each of the first trader and the second trader a registration fee for participation in the simulation of the real-time market for the financial instrument;
allocating a percentage of the registration fee to a winner's jackpot, in which the percentage is determined by at least one of the traders;
determining a winner of the simulation, the winner comprising a trader with a highest account value; and
paying the winner's jackpot to the winner.

4. The method of claim 1, wherein trading in the closed exchange is performed based on at least one rule customized by at least one of the traders, and wherein the at least one rule sets the period of time for simulated trading.

5. The method of claim 1, wherein the first and second traders are associated with at least one group of individuals competing in the closed exchange against at least one other group of individuals, and wherein the financial instrument comprises at least one of a corporate fixed income product, a treasury fixed income product, a swap, a REPO, and at least one mortgage.

6. The method of claim 1, wherein the at least one item of real-time information from the simulated market comprises at least one of (1) a then-current price for the financial instrument in the simulated market and (2) a price history of the financial instrument in the simulated market, wherein the price history is presented in at least one form selected from the group consisting of a chart, a graph, a table, and a spreadsheet.

7. The method of claim 1, wherein the at least one item of real-time information from the simulated market comprises a bid-offer queue for the financial instrument.

8. The method of claim 1, wherein the at least one item of real-time information from the actual market comprises at least one of (1) a price history of the financial instrument in the actual market, (2) a then-current price for the financial instrument in the actual market, and (3) a bid-offer queue for the financial instrument.

9. The method of claim 1, in which the at least one item of real-time information from the actual market comprises information about at least one order from the actual market.

10. The method of claim 1, further comprising:
receiving a plurality of orders from a plurality of participants on the closed exchange, the plurality of offers comprising one of (1) a plurality of bids for the financial instrument and (2) a plurality of offers for the financial instrument;

determining a ranked order of the plurality of bids based on at least one of a time of submission of the respective bid and a price of the respective bid; and determining a ranked order of the plurality of offers based on at least one of a time of submission of the respective offer and a price of the respective offer, in which the act of causing the interface screen to be displayed comprises causing the interface screen to display a bid-offer queue comprising (1) the plurality of bids displayed in the ranked order of the plurality of bids and (2) the plurality of offers displayed in the ranked order of the plurality of offers.

11. The method of claim 1, in which the at least one item of real-time information about the financial instrument from the actual market comprises at least one of a price history, volatility, current price, bid quote, ask quote, and daily volume associated with the financial instrument.

12. The method of claim 1, in which the act of causing by the at least one computing device an interface screen to be displayed at one or more workstations associated with a trader comprises:

causing a display on the interface screen of (1) one or more bid quotes for the financial instrument from an actual market and (2) one or more offer quotes for the financial instrument from an actual market.

13. The method of claim 1, in which the act of causing by the at least one computing device an interface screen to be displayed at one or more workstations associated with a trader comprises:

causing a display on the interface screen of (1) one or more bid quotes for the financial instrument from an actual market, (2) one or more offer quotes for the financial instrument from an actual market, (3) information about at least one bid for the financial instrument from the simulated market, and (4) information about at least one offer for the financial instrument from the simulated market.

14. The method of claim 13, in which the at least one bid from an actual market, the at least one offer from an actual market, the at least one bid from the simulated market, and the at least one offer from the simulated market are caused to be displayed in real time.

15. The method of claim 1, in which the act of causing by the at least one computing device an interface screen to be displayed at one or more workstations associated with a trader comprises:

causing a display on the interface screen of at least one bid and at least one offer from an actual market in a tabular format.

16. The method of claim 1, in which the at least one item of real-time information about the financial instrument from the simulated market comprises at least one item of real-time information about the at least one order for the financial instrument on the simulated market.

17. The method of claim 1, in which the simulated financial product is created based on at least one of (1) a spread differential between the simulated market and an actual market and (2) an arbitrage opportunity between the simulated market and the actual market.

18. The method of claim 1, further comprising:

receiving by the at least one computing device an order for the financial product from the second trader, wherein the order comprises at least one of (i) a bid to purchase the financial product and (ii) an offer to sell the financial product, wherein the first and the second traders are in communication with each other over a computer network; and executing by the at least one computing device at least one trade for the financial product between the first trader and the second trader at a price specified by at least one of the first trader and the second trader and for an amount of simulated funds determined based on the price.

19. An apparatus, comprising:

at least one computing device; and at least one memory that stores instructions which, when executed by the at least one computing device, direct the at least one computing device to perform a method comprising:

assigning a simulated amount of a financial instrument to at least a first trader in a closed exchange, the closed exchange comprising the at least one computing device and operating over a period of time simulating a real-time market for the financial instrument;

assigning an amount of simulated funds to at least a second trader in the closed exchange;

receiving at least one order for the financial instrument from one of the first trader and the second trader, wherein the order comprises at least one of (i) a bid to purchase the financial instrument on a simulated market and (ii) an offer to sell the financial instrument on a simulated market, wherein the first and the second traders are in communication with each other over a computer network;

causing an interface screen to be displayed at one or more workstations associated with a trader, the interface screen comprising at least one item of real-time information concerning the financial instrument from the simulated market and at least one item of real-time information concerning the financial instrument from an actual market, the one or more workstations in electronic communication with the at least one computing device;

receiving at least one counter order for the financial instrument from the other one of the first trader and the second trader;

executing at least one trade between the first trader and the second trader for the financial instrument at a price specified by at least one of the traders and for an amount of simulated funds determined based on the price; and creating a simulated financial product based at least in part on at least one difference between the simulated market and the actual market.

20. The apparatus of claim 19, the method further comprising:

receiving an order for the financial product from the second trader, wherein the order comprises at least one of (i) a bid to purchase the financial product and (ii) an offer to sell the financial product, wherein the first and the second traders are in communication with each other over a computer network; and executing at least one trade for the financial product between the first trader and the second trader at a price specified by at least one of the first trader and the second trader and for an amount of simulated funds determined based on the price.

21. The apparatus of claim 19, wherein the at least one item of real-time information from the simulated market comprises at least one of (1) a bid-offer queue for the financial instrument, (2) a then-current price for the financial instrument in the simulated market, and (3) a price history of the financial instrument in the simulated market, wherein the price history is presented in at least one form selected from the group consisting of a chart, a graph, a table, and a spreadsheet, and wherein the at least one item of real-time information from the actual market comprises at least one of (1) a price history of the financial instrument in the actual market, (2) a then-current price for the financial instrument in the actual market, (3) information about at least one order from the actual market, and (4) a bid-offer queue for the financial instrument.

22. A method comprising:

creating by at least one computing device a simulated financial product based at least in part on at least one difference between a simulated market and an actual market;

assigning by the at least one computing device an amount of the financial product to a first trader in an exchange;

assigning by the at least one computing device an amount of simulated funds to a second trader in the exchange;

receiving by the at least one computing device an order for the financial product from the second trader, wherein the order comprises at least one of (i) a bid to purchase the financial product and (ii) an offer to sell the financial instrument, and wherein the first and the second traders are in communication with each other over a computer network; and executing by the at least one computing device at least one trade for the financial product between the first trader and the second trader.

23. The method of claim 22, further comprising:

receiving an order for the simulated financial product from the second trader, wherein the order comprises at least one of (i) a bid to purchase the simulated financial product and (ii) an offer to sell the simulated financial product, wherein the first and the second traders are in communication with each other over a computer network; and executing at least one trade for the simulated financial product between the first trader and the second trader at a price specified by at least one of the first trader and the second trader and for an amount of simulated funds determined based on the price.

24. The method of claim 22, further comprising:

causing by the at least one computing device an interface screen to be displayed at one or more workstations associated with a trader, the interface screen comprising at least one item of real-time information associated with the financial instrument from the simulated market and at least one item of real-time information associated with the financial instrument from an actual market, the one or more workstations in electronic communication with the at least one computing device, wherein the at least one item of real-time information from the simulated market comprises at least one of (1) a bid-offer queue for the financial instrument, (2) a then-current price for the financial instrument in the simulated market, and (3) a price history of the financial instrument in the simulated market, wherein the price history is presented in at least one form selected from the group consisting of a chart, a graph, a table, and a spreadsheet, and wherein the at least one item of real-time information from the actual market comprises at least one of (1) a price history of the financial instrument in the actual market, (2) a then-current price for the financial instrument in the actual market, (3) information about at least one order from the actual market, and (4) a bid-offer queue for the financial instrument.

25. The method of claim 22, in which the act of creating the simulated financial product comprises:

determining a spread differential between the simulated market and an actual market;

creating a simulated financial product based on the spread differential.

26. The method of claim 22, in which the act of creating a simulated financial product comprises:

determining an arbitrage opportunity between the simulated market and an actual market;

creating a simulated financial product based on the arbitrage opportunity.

* * * * *